UNITED STATES PATENT OFFICE.

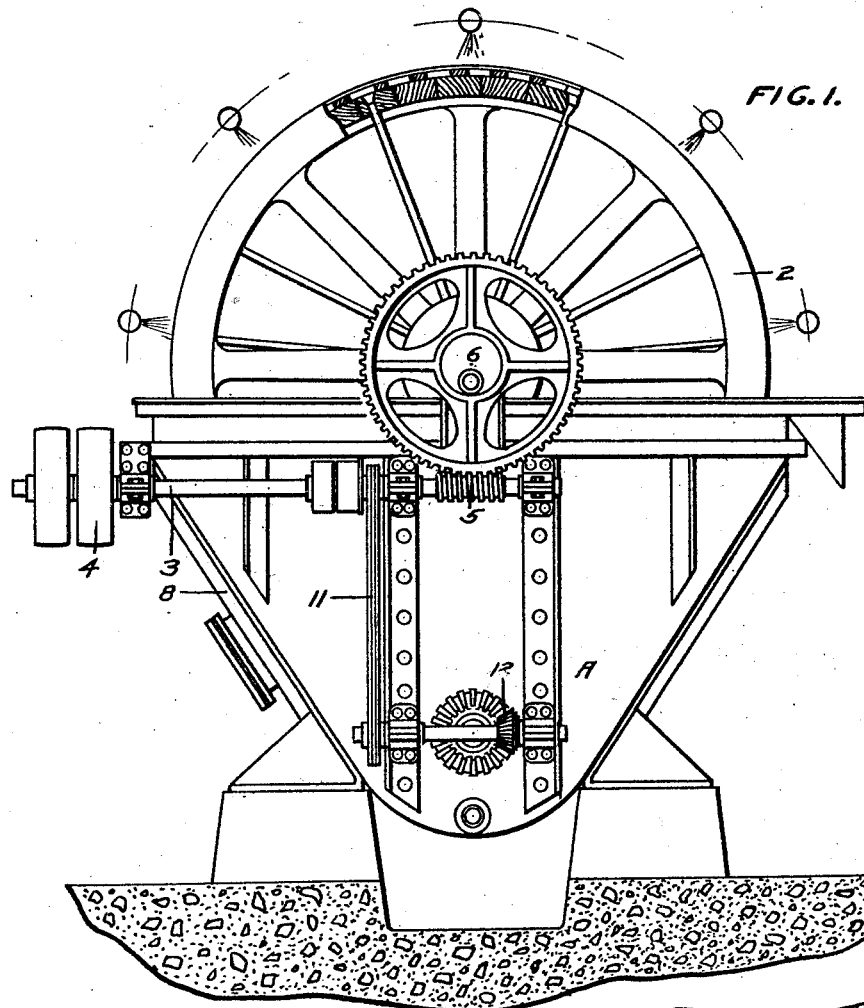

EDSON S. PETTIS, OF MILL VALLEY, CALIFORNIA.

DRUM-FILTER AGITATOR.

1,410,221.

Specification of Letters Patent. Patented Mar. 21, 1922.

Application filed March 5, 1919. Serial No. 280,762.

*To all whom it may concern:*

Be it known that I, EDSON S. PETTIS, a citizen of the United States, residing at Mill Valley, in the county of Marin and State of California, have invented a new and useful Improvement in Drum-Filter Agitators, of which the following is a specification.

This invention relates to an agitator for drum, vacuum filters, and the like.

The general object of the invention is to provide means for attaining a positive circulation of the liquid and the solids carried thereby within the filter receptacle.

Drum and disk types of vacuum filters are generally supplied with a mechanical agitating device which tends to maintain a homogeneous mixture or uniform filtration of the contents delivered to the tank or container; the real function of the agitator being to keep the solids in suspension in the semi-solid mixture and not allow classification by gravitation of the coarse or heavy ingredients.

Three distinct methods of agitation are used at the present time in conjunction with vacuum filters, to-wit; (1) compressed air blown in from the bottom of the tank or through circulating pipes on the exterior; (2) paddles mounted on a revoluble shaft positioned directly under the filtering units; (3) rakes hung and extending under the filtering units having an oscillating motion.

The present paddle type of agitator, when in operation, has a churning motion immediately around the shaft and paddles and only agitates the material at the extreme bottom of the tank. A deep hopper bottom tank is, therefore, required with this type of agitator, and as the tank space becomes too great for economical and efficient results, it is obvious that this type is more or less useless. What is truly needed is an agitating device which tends to circulate the tank contents uniformly, forcing the material from the bottom of the tank towards the surface directly under the filtering medium. This result is obtained by using exterior pipes extending from the bottom of the filter tank to a point near the top and introducing air through the bottom ends of said pipes. This effects the circulation desired as it keeps the pulp in agitation and discharges it directly in front of the filtering medium, thus insuring a more uniform mixture for the first deposition of cake solids on a filter medium.

Air cannot be used on all classes of material and, therefore, to insure a uniform mixture throughout the filter tank the oscillating type of agitator is used. There are, however, serious objections to the oscillating type of agitator, inasmuch as when the operation of the rakes is temporarily stopped the solids in the mixture are apt to settle and pack rigidly between the rakes which cannot be put in motion again unless by draining the tank of all contents.

The paddle type of agitator is simple in construction and more readily put in motion and can be put in motion without draining the tank of its contents after a short delay of operation, but the results are not satisfactory.

To accomplish the desire results and to avoid the objections mentioned, I place a housing or baffle partition in the bottom of the tank which tends to separate the back and forward portions of the tank at a point underneath the filter units. Within this baffle housing I place one or more impeller agitators, for instance of the screw or scroll type, which, when put in motion maintain the circulation from one side to the other or from the ends to the center and up on either side. With this arrangement an entirely different result is obtained and the circulation is positive and in the direction most desired.

A clearer conception of the invention may be obtained by referring to the accompanying drawings, in which—

Fig. 1 is an end view of a standard form of rotary drum filter, showing the application of my invention.

Fig. 2 is a plan view, partly broken away, showing the housing and the impellers mounted therein, whereby circulation of the pulp is obtained.

Fig. 3 shows a slight modification of the arrangement shown in Fig. 2.

Referring to the drawings in detail, A indicates, in general, a filter tank and 2 a filter of the rotary drum type. The particular filter here shown is partially submerged in the material to be filtered and is provided with means for continuously rotating the drum, said means comprising a shaft 3, to which power may be transmitted from any suitable source by means of a pulley 4; the rotary movement of said shaft being transmitted through a pair of worm gears 5 directly to a shaft 6 by which the drum is supported. The outer surface of the drum is covered with a filtering medium 7, usually a fabric through which the liquid component of the material to be filtered is drawn by suction and from which the adhering solids are removed by a scraper and reverse air pressure.

In operating a filter as here shown, it is of great importance to keep the solids in suspension in a condition of agitation to prevent classification by gravitation of the coarse or heavy ingredients contained, and it is also important to direct the solids towards the filtering medium at a point where the suction is most effective.

This is accomplished in the present instance by introducing the pulp into the tank A on the side shown at 8 and then circulating the pulp so that it is carried from one side of the tank to the other. This is accomplished in the present instance by placing a housing 9 (see Fig. 2) lengthwise of the tank and within the same at a point directly below the drum, said housing tending to separate the back and forward portions of the filter receptacle at a point underneath the filtering drum.

Extending through the housing is a shaft 10, to which rotary movement is transmitted from shaft 3 through a sprocket chain 11 and a set of bevel gears 12. Secured on the shaft and spaced with relation to each other are a series of screw-shaped impellers 13, and formed in the housing at points adjacent to each end of each impeller is an opening 14 and 15. The pulp delivered to the rear side of the filter, shown at 8, will, therefore, be drawn through the openings 14 by the suction created by the impellers and will then be discharged through the openings 15 which are arranged on the forward side of the tank and will thus be circulated to insure the most efficient operation.

With this arrangement efficient results are obtained as the circulation is positive and in the direction most desired; the speed of the pulp being so great that the coarse or heavy ingredients contained will not have an opportunity to settle and choke or clog the bottom portion of the tank. The objections previously spoken of concerning rake or paddle agitators are thus eliminated, and more efficient results are obtained than are possible with air circulation.

A slight modification of the arrangement shown in Fig. 2 is shown in Fig. 3. A baffle plate 17 is in this instance arranged at each end of the drum and the impellers 13 placed on the shaft draw the pulp from the rear of the tank by the ends of the drum and then discharge it into the forward side of the tank through openings 18. The circulation of the pulp is thus around the ends of the tank, thereby positively preventing any settling of heavy material which might otherwise interfere with the efficient operation of the filter.

The arrangement shown in Fig. 3 may also be provided with impellers interposed between the end propellers 13 and openings 14 and 15, if desired, so that a portion of the pulp may also be drawn from the rear to the forward side of the tank directly under the drum. I also wish it understood that the specific driving connection here shown and other features involved may be changed to suit various applications and conditions and that the materials and finish of the several parts employed may be such as the experience and judgment of the manufacturer may dictate.

Having thus described my invention, what I claim and desire to secure by Letters Patent is—

1. The combination with a pulp receiving tank and a filter member mounted therein, of a housing mounted within the tank below the filter member, said housing having a plurality of inlet and discharge openings formed therein on opposite sides, and means within the housing for maintaining a circulation of the pulp through the inlet and discharge openings.

2. The combination with a filter member and a tank supporting the same, of a housing arranged in the bottom of the tank, directly below the filter member, said housing serving the function of substantially dividing the tank into a front and rear portion, a series of inlet openings formed in one side of the housing, a series of discharge openings formed in the opposite side of the housing, and a series of impellers within the housing adapted to draw the pulp through the inlet openings and discharge it through the discharge openings to maintain the pulp within the tank in constant circulation.

3. The combination with a filter member and a tank supporting the same, of a housing arranged in the bottom of the tank and lengthwise thereof directly below the filter member, said housing serving the function of substantially dividing the tank into a front and a rear portion, a series of openings in said housing communicating with the front and rear portions of the tank, and means within said housing for drawing the pulp through the openings from the rear side of the tank and discharging it in the forward side.

4. The combination with a filter member and a tank supporting the same, of a housing arranged in the bottom of the tank and lengthwise thereof directly below the filter member, said housing serving the function of substantially dividing the tank into a front and a rear portion, a series of openings in said housing communicating with the front and rear portions of the tank, and a series of impellers within said housing adapted to draw the pulp through said openings from the rear side and discharge it into the forward side of the tank.

5. The combination with a rotary drum filter and a tank supporting the same, of a housing arranged in the bottom of the tank and extending lengthwise of the same, said housing forming a substantial baffle member dividing the tank into a forward and a rear portion, a series of openings formed in said housing, and means for circulating the pulp to be filtered and contained in the tank so that it passes through the openings in the housing from the rear side to the forward side of the tank.

6. The combination with a rotary drum filter and a tank supporting the same, of a housing arranged in the bottom of the tank and extending lengthwise of the same, said housing forming a substantial baffle member dividing the tank into a forward and a rear portion, a series of openings formed in said housing, a shaft extending through the housing, means for rotating said shaft, and a series of impellers on the shaft adapted to circulate the pulp to be filtered and contained within the tank so that it passes through the openings in the housing from the rear side and discharges into the forward side of the tank.

7. The combination with a rotary drum filter and a tank supporting the same, of a housing arranged in the bottom of the tank and extending lengthwise of the same, said housing forming a substantial baffle member dividing the tank into a forward and a rear portion, a series of openings formed in said housing, a shaft extending through the housing, means for rotating the filter drum, said means also adapted to rotate the shaft extending through the housing, and a series of impellers on said shaft adapted to draw the pulp from the rear side of the tank and discharge it into the forward side of the tank.

8. The combination with a filter member and a tank in which the member is mounted, of a housing arranged in the tank adjacent the bottom thereof below the filter member, inlet and discharge openings formed in said housing and means for maintaining a circulation of pulp through the inlet and discharge openings formed in the housing.

In testimony whereof I have hereunto set my hand in the presence of two subscribing witnesses.

EDSON S. PETTIS.

Witnesses:
G. M. BALL,
J. H. HERRING.